United States Patent [19]

Uehara et al.

[11] Patent Number: 5,009,584

[45] Date of Patent: Apr. 23, 1991

[54] INTERLOCK SYSTEM FOR ISOSTATIC FORMING PRESS

[75] Inventors: Katsuhiro Uehara; Masanori Kurita; Masakazu Murakami, all of Kobe, Japan

[73] Assignee: Kabushiki Kaisha Kobe Seiko Sho, Kobe, Japan

[21] Appl. No.: 487,444

[22] Filed: Mar. 2, 1990

[30] Foreign Application Priority Data

Mar. 2, 1989 [JP] Japan .................................... 1-51695

[51] Int. Cl.[5] .......................... B29C 43/10; B22F 3/04

[52] U.S. Cl. .................................... 425/135; 264/40.1; 419/49; 425/78; 425/153; 425/161; 425/170; 425/405.2; 425/595

[58] Field of Search ...................... 425/405.2, 149, 135, 425/153, 161, 170, 78, 595; 419/48, 49, 57; 432/199, 205; 264/40.3, 40.5; 146/153

[56] References Cited

U.S. PATENT DOCUMENTS

| | | | |
|---|---|---|---|
| 3,566,450 | 3/1971 | Roberts | 425/170 |
| 3,931,382 | 1/1976 | Witkin | 425/405.2 |
| 4,155,476 | 5/1979 | Lipiec et al. | 425/405.2 |
| 4,471,949 | 9/1984 | Ishii | 425/405.2 |
| 4,484,881 | 11/1984 | Asari et al. | 425/405.2 |
| 4,582,681 | 4/1986 | Asari et al. | 425/405.2 |
| 4,708,627 | 11/1987 | Asari et al. | 425/405.2 |

*Primary Examiner*—Jay H. Woo
*Assistant Examiner*—Khanh P. Nguyen
*Attorney, Agent, or Firm*—Oblon, Spivak, McClelland, Maier & Neustadt

[57] ABSTRACT

Described herein is an interlock system for an isostatic press machine of the type including a high pressure container having upper and lower closure plugs releasably received in upper and lower openings to be used for loading and unloading work therethrough, and a holder frame for supporting the axial force of the container in an isostatic pressing phase of the press operation, the holder frame being pivotally supported at one side thereof for swinging movements about a vertical axis into and out of a holding position in engagement with the high pressure container, wherein the interlock system is provided with a lock mechanism constantly urged to lock the holder frame in the holding position, and a control means adapted to control the lock mechanism to maintain the lock on the holder frame when the internal pressure of the high pressure container is higher than a predetermined level and to release the lock when lower than the predetermined level.

4 Claims, 3 Drawing Sheets

INTERLOCK SYSTEM FOR ISOSTATIC FORMING PRESS

FIELD OF THE INVENTION

This invention relates to an interlock system for hot or cold isostatic press machine.

BACKGROUND OF THE INVENTION

The hot isostatic forming press (hereinafter referred to simply as "HIP machine") is usually provided with a holder frame for supporting the axial force of a high pressure container during HIP process, the holder frame being mounted swingably about a vertical axis to facilitate loading and unloading of work into and out of the high pressure container and at the same time for the sake of compactness in construction, as disclosed in U.S. Pat. No. 4,484,881.

As shown in Prior Art FIGS. 3 to 5, the HIP machine of the just-mentioned publication has a base plate 8 securely fixed to one side of a panel body 7 which mounts thereon pressure gauges 1, compressor 2, automatic valves 3, indicator lamps 4, manual valves 5 and press button switches 6. A high pressure container 10 is mounted on the base plate 8 through a bracket 9, and a press frame 11 which serves to support the axial force of the high pressure container 10 during HIP process is pivotally mounted on the same side of the base plate through hinges 12 for pivoting movements about a vertical axis 13 toward and away from the high pressure container 10. In addition to internally provided heat insulator and heater, the high pressure container 10 has upper and lower closure plugs 15 and 16 in its upper and lower openings to be opened at the time of loading and unloading work.

In a HIP machine of this sort, the holder frame 11 is brought into a holding position where it is mechanically engaged with the upper and lower plugs 15 and 16 of the high pressure container to support the axial force of the latter during the HIP process. In this position, the holder frame is locked in position by pins or hooks which are put into or out of locking position manually by an operator. Therefore, even if the high pressure container is filled with a gas, the pins or hooks can be removed to disengage the holder frame 11 from the high pressure container 10 as long as the gas pressure is at a low level, namely, as long as the axial force is small.

However, it is often the case that a processing gas of several atmospheric pressures remains in the container 10 even after the processing gas has been released from the container at the end of a cycle of HIP operation. It follows that, if the holder frame 11 is removed inadvertently in such a case, there might be a danger of the upper and lower plugs being blown off by the gas pressure.

Further, the high pressure container 10 is usually filled with a pressurized inert gas of 2–3 $kgf/cm^2$ to prevent corrosion during a rest period between termination of a HIP operation and initiation of a next operation. Accordingly, the holder frame has to be held in the locking position even during the rest period by manually applying the pins or hooks, but a dangerous accident may incur by negligence on the part of the operator.

OBJECT OF THE INVENTION

In view of the above-mentioned problems or drawbacks of the conventional apparatus, the present invention contemplates providing an interlock system for an HIP forming press, which can lock the holder frame in a secure and reliable manner whenever necessary.

SUMMARY OF THE INVENTION

In accordance with the present invention, there is provided an interlock system for an isostatic press machine of the type including a high pressure container having upper and lower closure plugs releasably received in upper and lower openings to be used for loading and unloading work therethrough, and a holder frame for supporting the axial force of the container in a isostatic pressing phase of the press operation, the holder frame being pivotally supported at one side thereof for swinging movements about a vertical axis into and out of a holding position in engagement with the high pressure container, wherein the interlock system includes: a lock mechanism constantly urged to lock the holder frame in the holding position; and a control means adapted to control the lock mechanism to maintain the lock on the holder frame when the internal pressure of the high pressure container is higher than a predetermined level and to release the lock when lower than the predetermined level.

The lock mechanism 31 is released by the control means 36 when the pressure in the high pressure container 22 is lower than the predetermined level, permitting the holder frame 26 to swing about the vertical axis 27 toward or away from the holding position.

If the pressure in the high pressure container 22 is higher than the predetermined level, the lock mechanism 31 is urged into the locking position by the control means 36 to lock the holder frame 26 in the holding position. Accordingly, there is no possibility of the plugs 23 and 24 of the container being blown off even when an operator forgets to apply the lock mechanism 31 or even in the event of an operation error.

Since the lock mechanism 31 is constantly urged in the locking direction, the holder frame 26 can be locked securely even when power supply to the control means 36 is cut off.

The above and other objects, features and advantages of the invention will become apparent from the following description and the appended claims, taken in conjunction with the accompanying drawings which show by way of example a preferred embodiment of the invention.

DESCRIPTION OF THE PREFERRED EMBODIMENT

Figure 2:
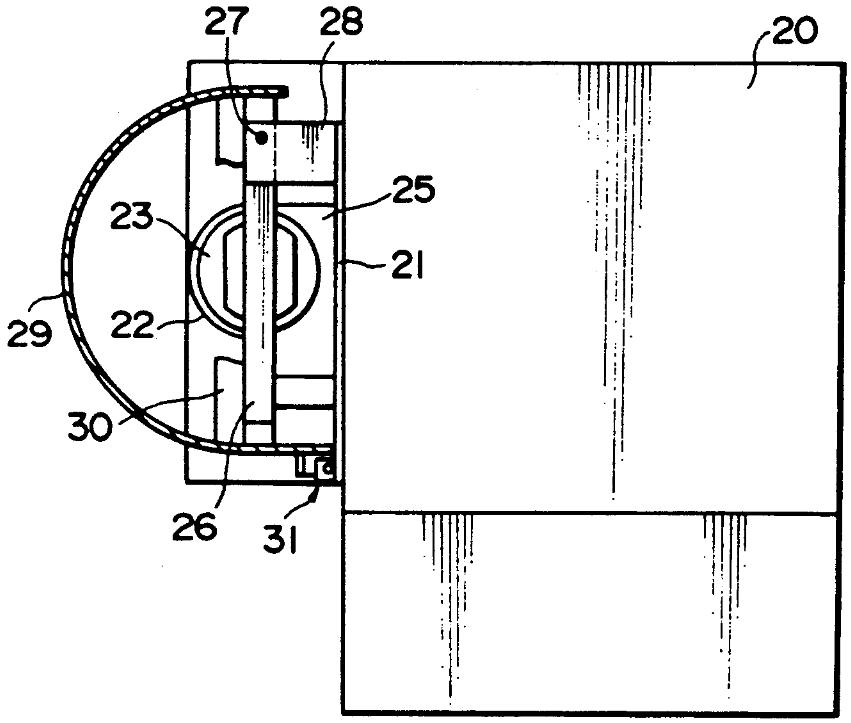
FIG. 2 is a partly cutaway plan view showing the general construction of a press incorporating the invention.
Figure 3:
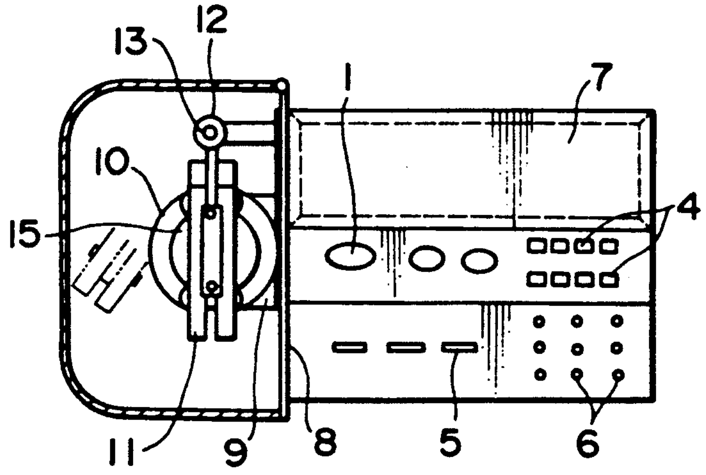
FIG. 3 PRIOR ART
FIG. 3 is a view similar to FIG. 2 but showing a conventional counterpart.
Figure 4:
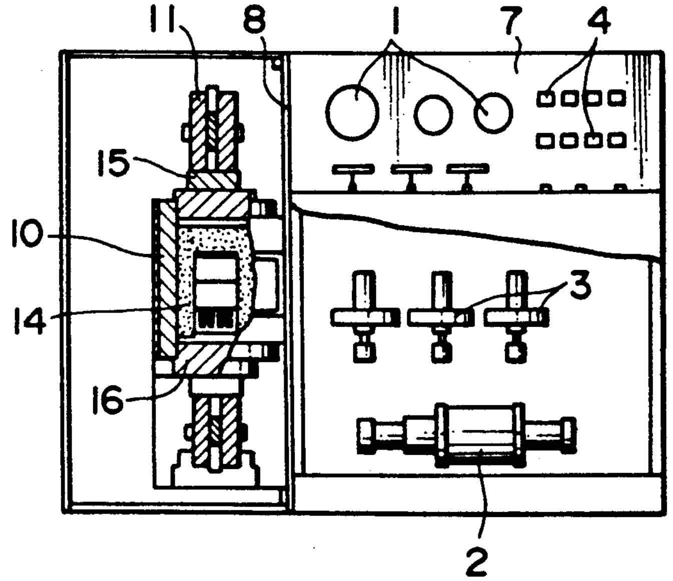
FIG. 4 PRIOR ART
FIG. 4 is a partly cutaway front view of the machine of FIG. 3.
Figure 5:
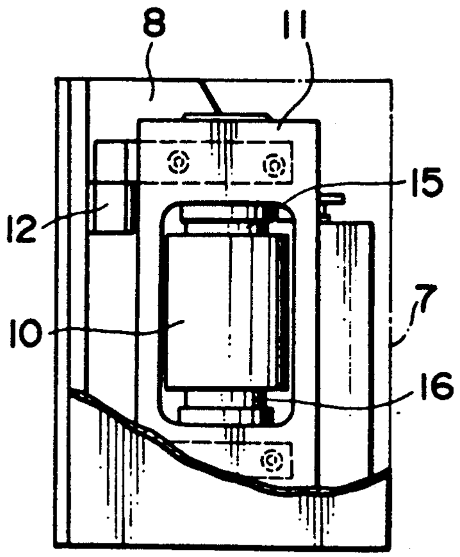
FIG. 5 PRIOR ART
FIG. 5 is a partly cutaway side view of the machine of FIG. 3.

Hereafter, the invention is illustrated more particularly by way of the preferred embodiment shown in the drawing. Referring to FIG. 2, indicated at 20 is a panel body which is provided with a base plate 21 at one side thereof. The reference 22 denotes a high pressure container which is provided with upper and lower closure plugs 23 and 24, and mounted on the base plate 21 through a bracket 25. Indicated at 26 is a holder frame which serves to support the axial force of the high pressure container 22 and which has one side thereof swingably or pivotally supported on the base plate 21 by a bracket 28 so that it can be manually moved toward and away from the high pressure container 22. A lock mechanism 31 is provided between the base plate 21 and the free end of a steel cover plate 29 which is securely fixed to the holder plate 26 through a support member 30.

Figure 1:
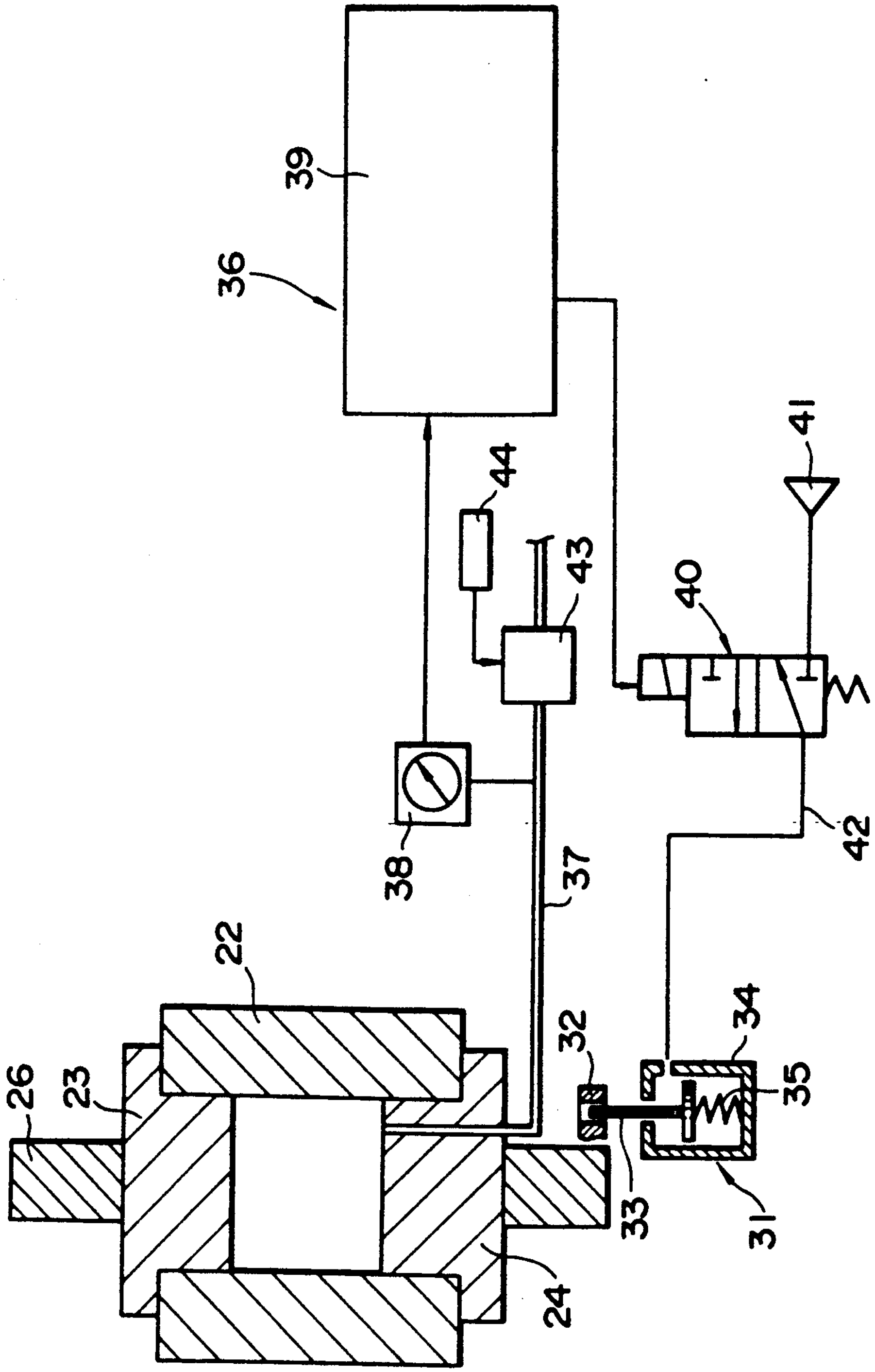
FIG. 1 is a schematic view of the major components of an interlock system embodying the invention.

The lock mechanism 31 includes, as shown particularly in FIG. 1, a lock plate 32 which is securely fixed on the cover plate 29, a lock pin 33 which is releasably engageable with the lock plate 32, and an air cylinder 34 which is mounted on the base plate 21 for locking and releasing the lock pin 33. The air cylinder 34 incorporates a biasing spring 35 which constantly urges the lock pin to protrude in the locking direction.

The air cylinder 34 of the lock mechanism 31 is operated by a control means 36 to lock the holder frame 26 when the pressure in the high pressure container 22 is higher than a predetermined level and to release the lock when lower than the predetermined level. More specifically, the control means 36 is constituted by a pressure switch 38 which is connected to a processing gas conduit 37 leading to the pressure container 22, a comparator 39 adapted to compare the pressure signal from the pressure switch 38 with a preset value, and an electromagnetic valve 40 which is driven by the output of the comparator 39. The electromagnetic valve 40 is inserted in an air conduit 42 which connects the air cylinder 34 with an air source 41. Another electromagnetic valve 43 which is inserted in the processing gas conduit 37 is rendered operable by a limit switch 44 which detects whether or not the holder frame 26 is in the holding position. Namely, the electromagnetic valve 43 is operated under interlock control in such a manner that it is rendered inoperable unless the limit switch 44 is actuated.

With the above-described arrangement, the electromagnetic valve 40 is energized by the output of the comparator when the pressure in the high pressure container 22 is lower than a predetermined level, operating the air cylinder 34 against the action of the spring 35 to disengage the lock pin 33 from the lock plate 32. Consequently, the holder frame 26 becomes free and can be turned about the vertical axis 27 by manual efforts.

If the holder frame 26 is moved into the holding position and brought into engagement with the upper and lower sides of the high pressure container 22, the limit switch 44 is actuated to permit opening of the electromagnetic valve 43. Therefore, the processing gas can be filled in the high pressure container 22 upon opening the electromagnetic valve 43 by a manual operation. The gas pressure is detected by the pressure switch 38 and, if the pressure in the container 22 becomes higher than a preset value, for example, higher than 1 $kgf/cm^2$, the electromagnetic valve 40 is de-energized by the output of the comparator 39, opening the air cylinder 34 to the atmosphere. As a result, the lock pin 33 is protruded to engage the lock plate 32, automatically locking the holder frame 26 securely in the holding position to prevent blow-off of the closure plugs 23 and 24 of the high pressure container 22 which would otherwise take place when the lock mechanism 31 is inadvertently unlocked or erroneously operated.

The power switch is cut off when the machine is at rest, but the lock pin 33 is constantly urged into the protruded position by the biasing spring 35 to retain the holder frame 26 securely in locked state.

The lock mechanism 31 and control means 36 are not restricted to the particular construction or form shown, and may be arranged in a different way to perform the functions described above. Further, the lock mechanism 31 may be provided within the cover plate 29 if desired.

As clear from the foregoing description, the interlock system of the invention employs the lock mechanism 31 which constantly urges the holder frame 26 into the holding position in combination with the control means 36 which is adapted to apply the lock when the pressure in the high pressure container is higher than a predetermined level and to release the lock when lower than the predetermined level. Therefore, the holder frame 26 is securely locked in the holding position by the lock mechanism 31 as long as the pressure in the container is greater than a predetermined value, preventing the accidents which would result from a negligence or operation error in locking the holder frame and maintaining the locked state even after the power supply has been cut off.

What is claimed is:

1. An interlock system for an isostatic press machine of the type including a high pressure container having upper and lower closure plugs releasably received in upper and lower openings to be used for loading and unloading work therethrough, and a holder frame for supporting the axial force of the container in an isostatic pressing phase of the press operation, the holder frame being pivotally supported at one side thereof for swinging movements about a vertical axis into and out of a holding position in engagement with the high pressure container, wherein said interlock system comprises:

a lock mechanism constantly urged to lock said holder frame in said holding position; and a control means adapted to control said lock mechanism to maintain said holder frame in said holding postion when the internal pressure of said high pressure container is higher than a predetermined level and to release the lock mechanism when the internal pressure of said high pressure container is lower than said predetermined level.

2. An interlock system as defined in claim 1, wherein said lock mechanism comprises an air cylinder incorporating a biasing spring, and a lock pin constantly urged by said biasing spring into engagement with a lock plate on said holder frame.

3. An interlock system as defined in claim 1, wherein said air cylinder is communicable with either the atmosphere or an air source through a valve means operated by said control means.

4. An interlock system as defined in claim 1, wherein said control means comprises a pressure switch provided in communication with a processing gas conduit leading to said high pressure container, a valve means inserted in said processing gas conduit, a switch means for turning on said valve means when said holder frame is in said holding position, and a comparator for comparing output signal from said pressure switch with a preset value.

* * * * *